(12) United States Patent
Gerum et al.

(10) Patent No.: US 6,234,587 B1
(45) Date of Patent: May 22, 2001

(54) COMPRESSED-AIR DISK BRAKE

(75) Inventors: Eduard Gerum, Rosenheim; Armin Theiss, Mauth; Hans Baumgartner, Moosburg; Dieter Bieker, Oberaudorf, all of (DE)

(73) Assignee: Knorr-Bremse Systeme fur Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/330,013
(22) PCT Filed: Dec. 18, 1997
(86) PCT No.: PCT/EP97/07099
 § 371 Date: Jun. 11, 1999
 § 102(e) Date: Jun. 11, 1999
(87) PCT Pub. No.: WO98/26968
 PCT Pub. Date: Jun. 25, 1998

(30) Foreign Application Priority Data

Dec. 18, 1996 (DE) ............................... 196 52 806

(51) Int. Cl.$^7$ ............................... B60T 8/36; B60T 13/36; F16D 55/02
(52) U.S. Cl. .................................. 303/118.1; 188/1.11 W; 188/72.1; 188/72.6; 188/72.9; 188/153 R; 188/153 D; 188/170; 303/DIG. 10; 303/9.76; 303/71; 303/119.2; 303/DIG. 3; 303/68
(58) Field of Search .................................. 188/72.1–72.9, 188/170, 153, 1.11, 156–158, 162, 73.31; 303/118.1, DIG. 10, 71, 119.1, 9.76, 119.2, 115.3, 28, 29, 30, 119.3, 166, DIG. 4, DIG. 3, 127–136, 69, 68, 123, 7–9; 92/5 R, 63, 130 A

(56) References Cited

U.S. PATENT DOCUMENTS 3,756,661 * 9/1973 Michellone ....................... 303/118.1
3,768,875 * 10/1973 Davis et al. ...................... 303/119.2
3,799,297 * 3/1974 Ryburn et al. ....................... 188/170
3,980,348 * 9/1976 Harrison ............................. 303/115.3
4,014,579 * 3/1977 Dubois ................................... 303/71
4,088,376 * 5/1978 Lindemann et al. .............. 303/118.1
4,093,317 * 6/1978 Lindemann et al. .............. 303/118.1
5,118,165 * 6/1992 Latvala ................................... 303/71
5,515,949 * 5/1996 Baumgartner et al. ............. 188/72.9
5,927,445 * 7/1999 Bieker et al. ....................... 188/72.9

FOREIGN PATENT DOCUMENTS 1655103    4/1971 (DE) .
1655854    8/1971 (DE) .
2101573 *  7/1972 (DE) .................................. 303/118.1
2541563 *  3/1977 (DE) .................................. 303/118.1
4032885    4/1992 (DE) .
0105219   11/1984 (EP) .
0743469 * 11/1996 (EP) .
1359487   10/1974 (GB) .
1369732 * 10/1974 (GB) .
WO92/12880  6/1992 (WO) .
9634216 * 10/1996 (WO) .
9826968 *  6/1998 (WO) .

OTHER PUBLICATIONS

Kraftfahr Technisches Taschenbuch, Bosch Automotive Engineering Manual, 22nd Edition, ISBN 3–18–419122–2.

* cited by examiner

Primary Examiner—Douglas C. Butler
(74) Attorney, Agent, or Firm—Barnes & Thornburg

(57) ABSTRACT

A compressed-air disk brake for vehicles comprises an actuating device for applying brake blocks in the direction of a brake disk and a brake cylinder, which, on arrival of the compressed air, initiates a braking action via the actuating device. At least one control module, comprising individual pneumatic and electronic components, is incorporated into the brake and/or the associated brake cylinder. For example, the control module may be formed directly on the brake cylinder housing section which encloses the ventilation chamber.

28 Claims, 6 Drawing Sheets

COMPRESSED-AIR DISK BRAKE

SUMMARY AND BACKGROUND OF THE INVENTION

The invention relates to a compressed-air disk brake and more specifically electropenumatic compressed air disk brakes.

A compressed-air disk brake is known from German Patent Document DE 40 32 885 A1. The disk brake for utility vehicles shown in that document has had good results per se, but a structural and constructional simplification is desirable for reducing its manufacturing costs. The same applies to the brake systems disclosed in German Patent Documents DE 16 55 103 B2 and DE-OS 16 55 854.

Compressed-air cylinders in different embodiments are known, for example, from "Bosch Automotive Engineering Manual", 22nd Edition, ISBN 3-18-419122-2. On Page 655, this manual mentions piston-type as well as diaphragm-type cylinders as well as combined single-chamber spring-loaded cylinders as successful standard examples.

The above-mentioned cylinders have had good results per se and represent a component of the overall brake system which is reliable as a whole. Based on this starting situation, the invention uses the idea that the interaction of individual components of the disk brake or of the whole brake system, particularly of the cylinders, in modern, electronically controlled brake systems (EBS brake systems) be rethought and optimized.

The invention achieves this goal. The disk brake according to the invention thus differs from the disk brake of the above-mentioned type in that, in each case, at least one control module with electronic and pneumatic/mechanical components (particularly a complete EBS wheel module) is integrated in the brake and/or in the brake cylinder. In addition, the invention achieves this goal in that, in the case of a brake cylinder of the above-mentioned type, it arranges a control module directly on one of the housing sections of the brake cylinder.

The invention implements an advantageous and low-cost integration of a control module with the actual disk brake, particularly with its brake cylinder, and therefore combines previously separate components (brake cylinder or other elements of the disk brake with the control module) to form a constructional unit.

When implementing modern electronic braking systems, the desire to obtain intelligent vehicle brakes has intensified in recent times, which vehicle brakes would integrate all electronic and mechanical control elements in the wheel brake (or arrange these elements in the brake). Among other things, this would considerably reduce the mounting expenditures in the vehicle.

The idea of a wheel-related control module has developed therefrom which combines electronic and pneumatic components with one another. Such a module is, for example, designed such that a compressed-air pipe as well as an electronic control cable lead to the module; in which case, by means of the pneumatic and electronic components of the control module, at least the functions "control pressure into the brake cylinder" and "lower pressure" can be implemented. For this purpose, the control module comprises, for example, a relay valve, preferably several solenoids connected in front of the relay valve, a pressure sensor, a bus connection, a compressed-air connection, etc. Preferably, the control modules of different wheels should be able to communicate with one another, either by way of a control unit or directly.

If, according to the invention, the control module is now combined with the disk brake and/or the brake cylinder to form a constructional unit, the mounting and cabling expenditures are reduced because, instead of several separate elements, only one component must be integrated and inserted in the installation space of the wheel brake.

A particularly preferred embodiment of the invention is that the brake cylinder and the disk brake form a construction unit. This embodiment of the invention further considerably simplifies the construction of the disk brake (specifically also if the control module is not also integrated in the disk brake). The integration of the control module first causes the elimination of otherwise required electric and pneumatic connection lines and of an additional housing. The additional integration of the brake cylinder in the brake construction then has the additional result that an otherwise required connection is eliminated between the brake cylinder and disk brake components which, during repair and assembly work, also always represents an additional possible source of errors.

According to a particularly preferred and expedient embodiment of the invention, the brake cylinder is integrated in the caliper. As a result, no more dirt can penetrate into the caliper when the brake cylinder is exchanged. On the contrary, it will only be necessary, for exchanging the brake cylinder, to exchange an insert which comprises the internal components of the brake cylinder (piston, piston rod, etc.). An additional sealing is eliminated and it is possible to expose the whole brake interior only to dried compressed air from the brake system, which, among other things, also reduces the danger of corrosion. This will be explained in greater detail.

The invention also makes it possible to provide a standardized brake cylinder which no longer has to be adapted to different usages. This applies particularly when the control module is designed such that a complete EBS function can be implemented by it. In this context, it is particularly advantageous for the adjusting of the otherwise pneumatically operated brake to take place by an electric adjusting motor. By the electric adjusting motor and a suitable control software, it is also possible to design the adjusting mechanism at particularly low cost. As the result of the construction of the cylinder as a piston cylinder, a particularly compact construction can be achieved.

According to another, particularly preferred embodiment of the invention, the control module is molded directly to the housing section for the ventilation chamber. The control module is therefore arranged in an advantageous and simple manner in a component of the brake which must be changed only insignificantly in order to integrate the control module in it or combine it with this component. In addition, this variant of the invention has the special advantage that the control module is mounted directly and without the requirement of additional internal or external feed lines on the part of the brake cylinder which has a direct access to the ventilation chamber of the cylinder. It is therefore possible to control the air for acting upon the piston(s) directly behind the piston. Another advantage is that the additional components, for example, in the case of an arrangement of the control module on the housing, the other components, such as the cover, the piston and the diaphragm—do not have to be changed further in order to equip the brake cylinder, in contrast to the conventional construction, with a control module. Another advantage of this embodiment of the invention is that the flanging onto the brake—preferably the flanging to a compressed-air disk brake for trucks— because of the integrated module, requires no adaptation.

Another significant advantage of the invention is that, by means of it, it is generally possible to retrofit in an uncomplicated and easy manner a vehicle series of a conventional brake system, to form an EBS brake system. Modifications of the control module can be carried out without additional expenditures; only the housing may have to be adapted in a simple manner. Another advantage is finally, that the cover of the compressed-air cylinder is normally the component of the utility vehicle brake which is the easiest to change (type of construction).

Additional advantageous embodiments of the invention are found in the other subclaims.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1B:
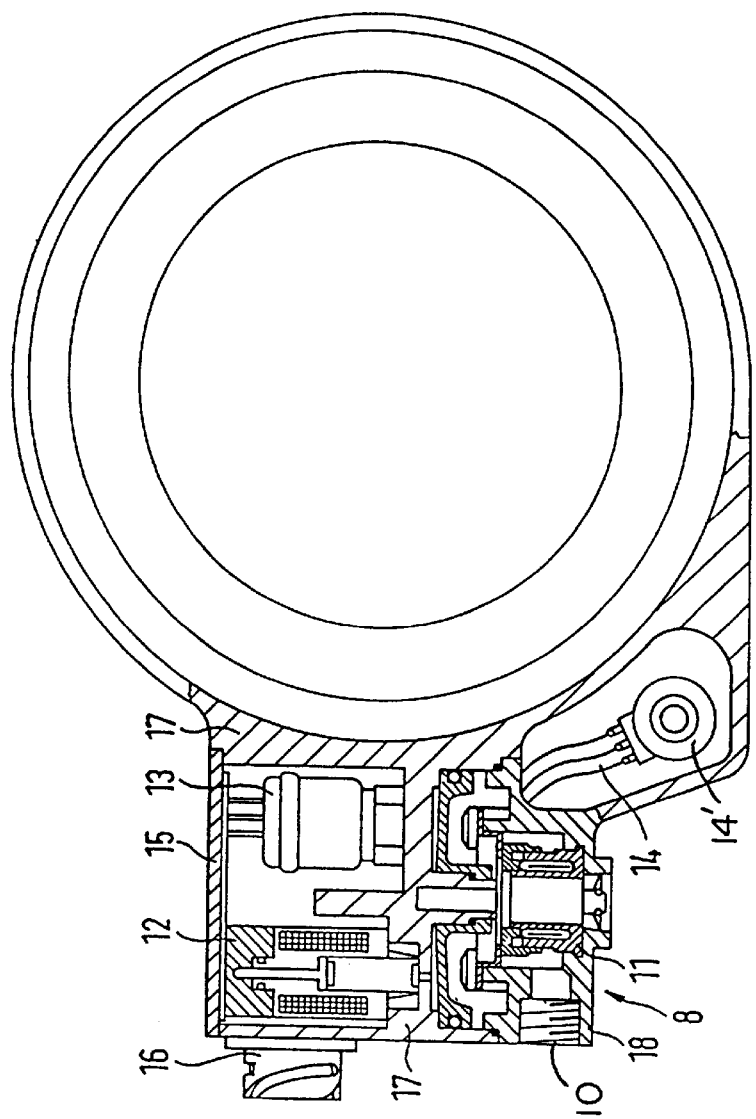
FIG. 1B is a schematic view analogous to FIG. 1A which is rotated by 90° with respect to FIG. 1A.

FIG. 1 illustrates a diaphragm-type brake cylinder 1 for compressed-air disk brakes of utility vehicles which essentially has two housing sections, namely, cover 2 with a closure section 2' and an inserted snap ring 2" which reaches around a projection 3' of a bottom part 3. One of the housing sections—here, the cover 2—encloses a ventilation chamber 4 for the compressed-air supply and discharge. The pneumatic operation of the diaphragm-type cylinder takes place in a conventional manner; that is, when the brake is operated and released, the diaphragm 5 moves back and forth with the piston 6 and the piston rod 7. A control module 8 is molded directly to the cover 2 of the cylinder closing the ventilation chamber. The control module 8 comprises electronic and pneumatic-mechanical control sections, by which the pneumatic pressure can be controlled into the brake cylinder and can be lowered in it. For this purpose, the control module 8 also has two pneumatic connections (9, 10), the pneumatic connection 9 connecting the brake cylinder with a complete pneumatic release or hold-back plane—constructed in the conventional manner—(not shown) and the pneumatic connection 10 implementing the compressed-air supply for the control module 8.

The control module 8 here comprises a relay valve 11, solenoids 12 for the implementation of different functions (of which one is visible in the sectional view of FIG. 1B), a pressure sensor 13 as well as an electrical connection 14 to the lining wear sensor 14' for the disk brake. The information of the lining wear sensor 14' and of the pressure sensor 13 are connected by a bus connection on the connector plate 15 to the (not shown) control unit. The control signals from the control unit to the control module 9 are connected by a multi-core cable (not shown) to the electric connector 16. The exact further development and circuit-related linking of the pneumatic and electronic elements in the control module 8 depends on the required demand profile and can easily be implemented arbitrarily by a person skilled in the art.

The control module 8 has a central structure section 17 which is constructed in one piece with the housing of the cover 2 and comprises recesses into which the individual elements of the control module 8 fit, and which, in addition, is closed off in a simple and advantageous manner toward the outside by the connector plate 15 and by a closure body 18.

Figure 1A:
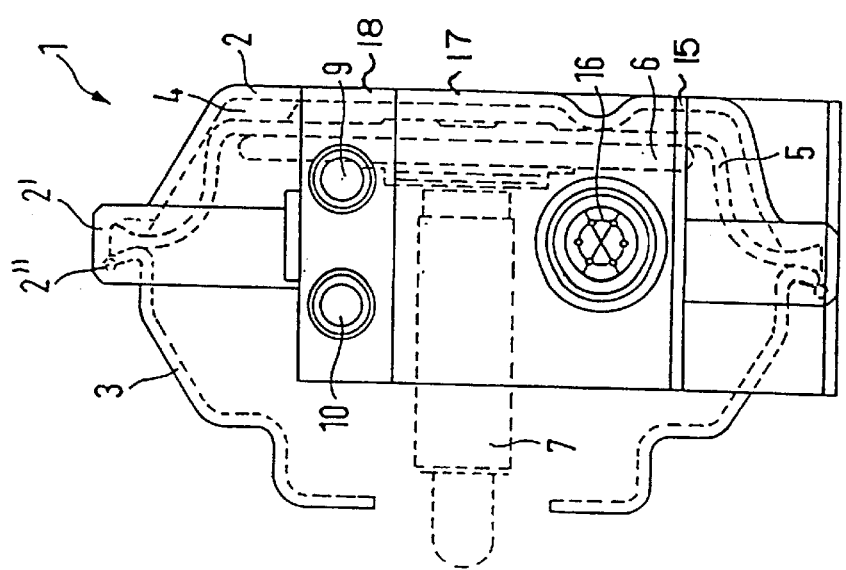
FIG. 1A is a partial sectional view of a diaphragm-type brake cylinder according to the invention.

It should be noted that in FIGS. 1A and 1B, only the pneumatic 9, 10 and the electric 16 connector arrangement differ from one another (in FIG. 1A, the pneumatic connections are provided "on top"; in FIG. 1B, these are "on the bottom"). An arrangement of the control module analogous to FIG. 1 can be implemented on a piston cylinder.

Figure 2A:
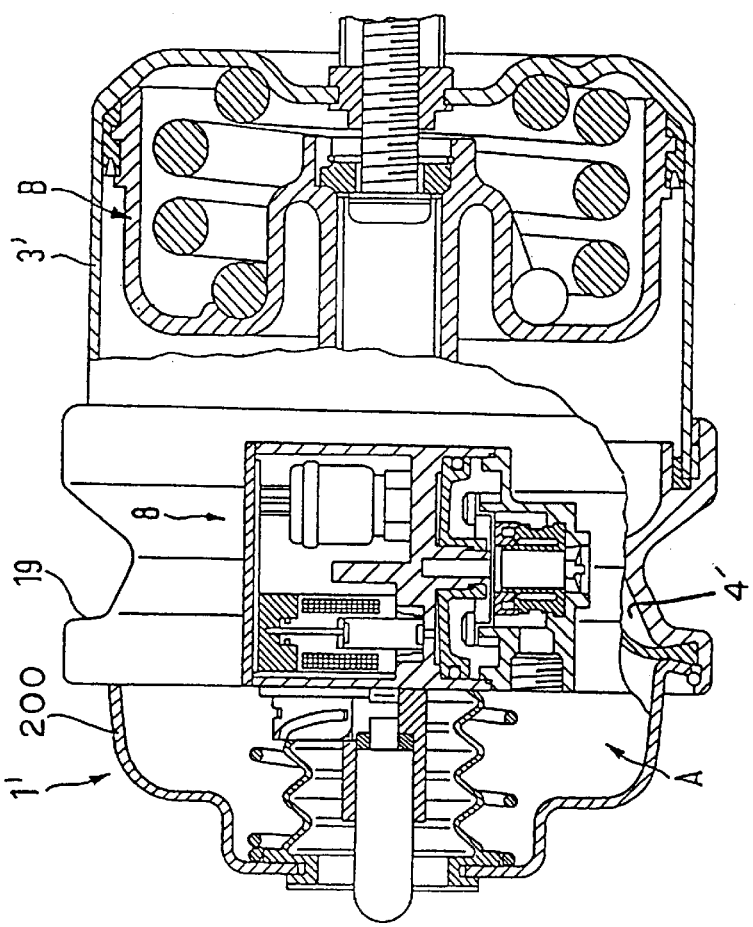
FIG. 2A is a partial sectional view of another embodiment of a combination cylinder according to the invention.
Figure 2B:
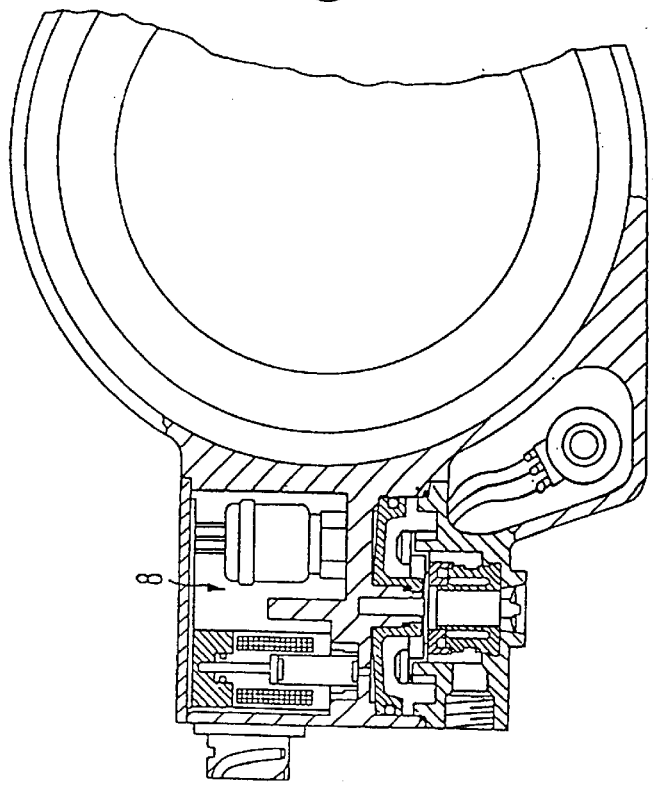
FIG. 2B is a schematic view analogous to FIG. 2A which is rotated by 90° with respect to FIG. 2B.

FIGS. 2A and 2B show a combination cylinder 1' which is essentially composed of three housing sections namely, cover 200' intermediate part 19 and bottom part 3'. One of the housing sections—here, the intermediate part 19—close the ventilation chamber 4'. The pneumatic-mechanical function of the combination cylinder with the diaphragm-type cylinder section A and the spring-loaded piston cylinder section B must not be changed on the basis of the invention in comparison to the conventional arrangement. The control module 8 is again molded directly to the housing section closing the ventilation chamber 4', here, the intermediate section 19. The functional construction of the control module 8 corresponds to the embodiment of FIG. 1. The main advantage of this embodiment of the invention again consists of the fact that only a slight change of the intermediate section 19 is necessary and that the additional components of the cylinder 1 must not be varied because of the invention.

Figure 3:
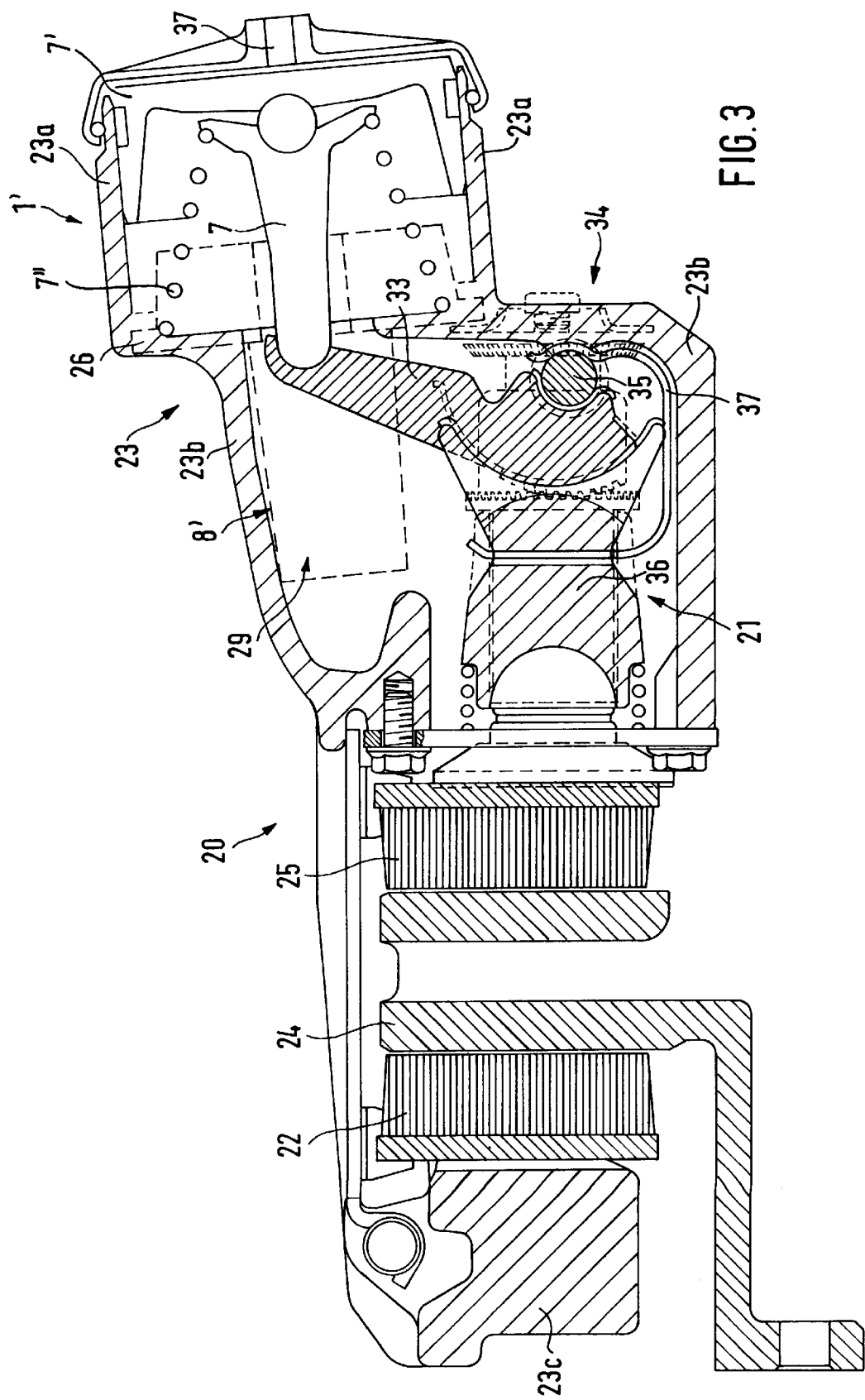
FIG. 3 is a sectional view of an embodiment of a disk brake having an integrated brake cylinder.
Figure 6:
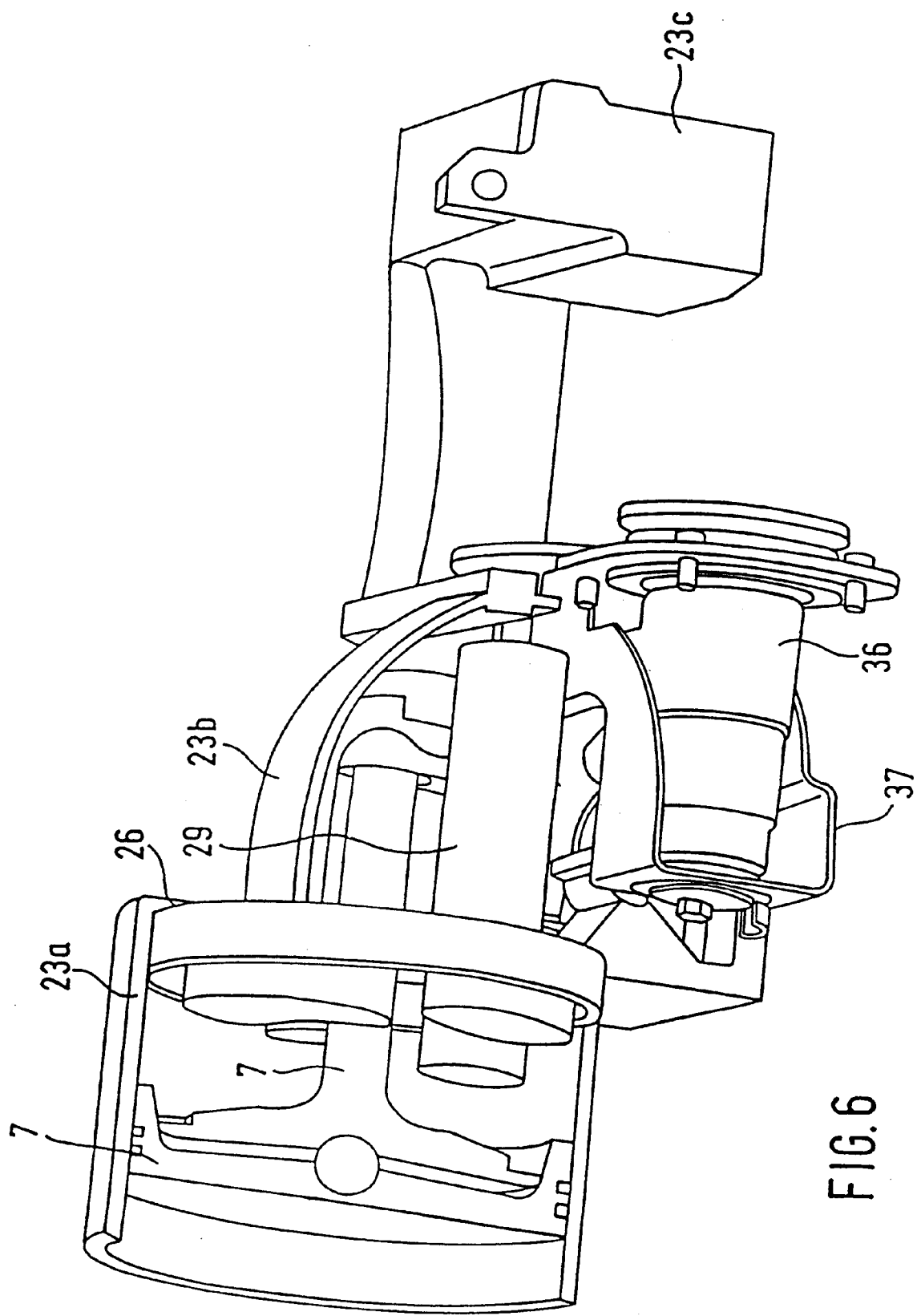
FIG. 6 is a perspective view of the brake caliper with the inserted control module of FIG. 4 for the brake of the type of FIG. 3.

FIG. 3 illustrates a compressed-air disk brake 20 for utility vehicles with an actuating device 21 for the application of brake blocks 22, 25 in the direction of a brake disk 24. The selected design of the caliper 23 (see also FIG. 6), in which the brake cylinder 1' is integrated, is particularly advantageous. For this purpose, the preferably one-piece caliper 23 has essentially three partial areas. A first partial area 23a forms the outer housing of the brake cylinder 1' and receives the conventional internal components of a piston cylinder (piston rod 7, plastic piston 7', spring 7"). A second partial area 23b is molded to the first partial area 23a and, in which the actuating device 21 of the disk brake 20 is arranged. A third partial area 23c is molded to the second partial area 23b and comprises the brake disk 24 and the two brake blocks 22, 25. The partial area 23c is used for transmitting the application forces from the actuating side of the disk brake (thus, the side of the actuating device 21) to the reaction side. As an alternative, it would be conceivable to construct this third partial area 23c in the manner of a separate band or body which frames the brake disk 24 and the brake blocks 22, 25, in order to further reduce the weight of the disk brake (not shown).

The integration of the brake cylinder 1' in the caliper 23 eliminates particularly the necessity of sealing off the cylinder secondary chamber receiving the control unit 8 with respect to the brake interior (in area 23b). This sealing-off is replaced by an automatic or controlled ventilation system of the secondary chamber of the brake cylinder 1' and of the area 23b, which (by way of a valve not shown) receives afterflowing air from the compressed-air system and delivers outflowing air into the environment. This results in the particularly important advantage that only dried air from the compressor delivery is always present in the brake interior (possibly also under a definable pressure) and no additional encasing is required. This is particularly advantageous because the different control components may be sensitive to wetness and are therefore securely protected against moisture. A pressure in the secondary chamber and in the area 23b is recommended which is by approximately 20–50 mbar above the ambient pressure. The whole brake interior is therefore securely protected in a simple manner against corrosion.

Figure 4:
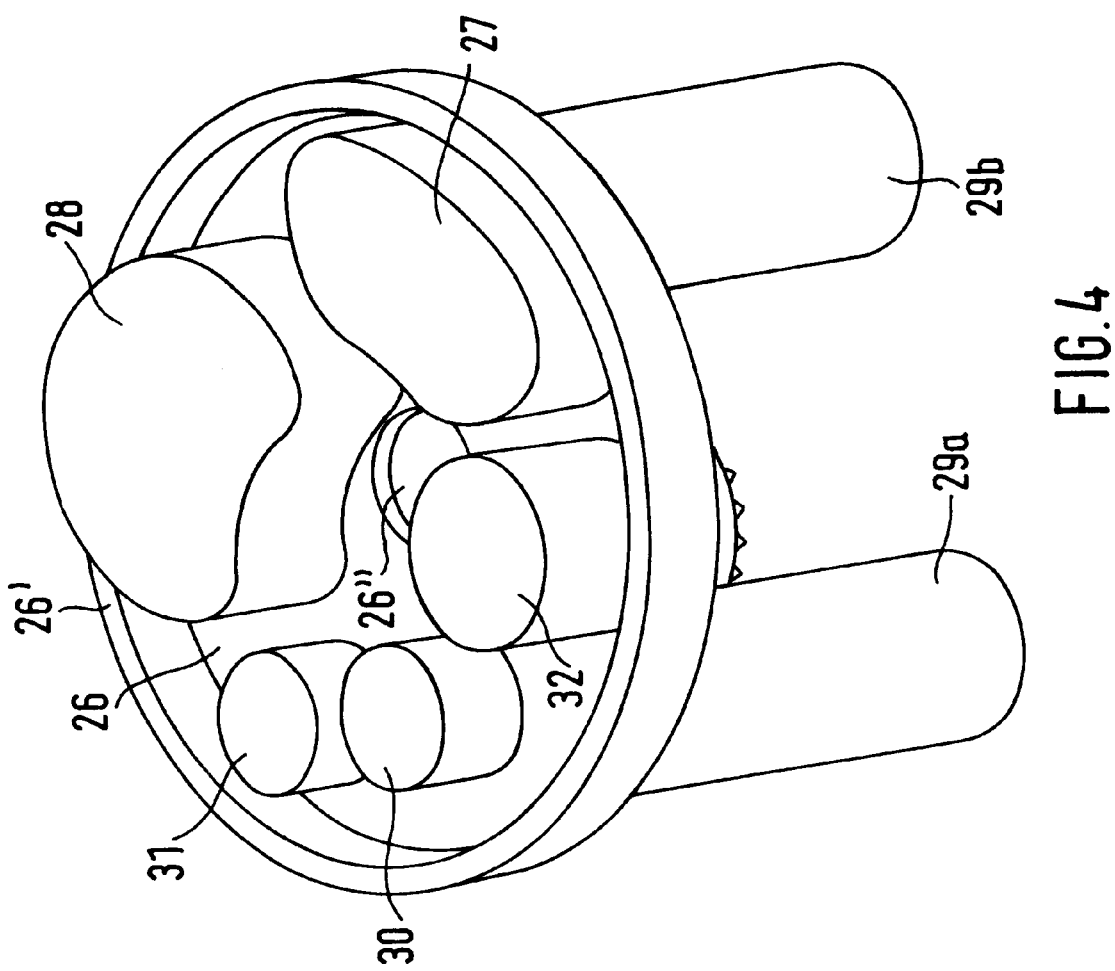
FIG. 4 is a perspective view of a control module suitable for the disk brakes of FIG. 1.
Figure 5:
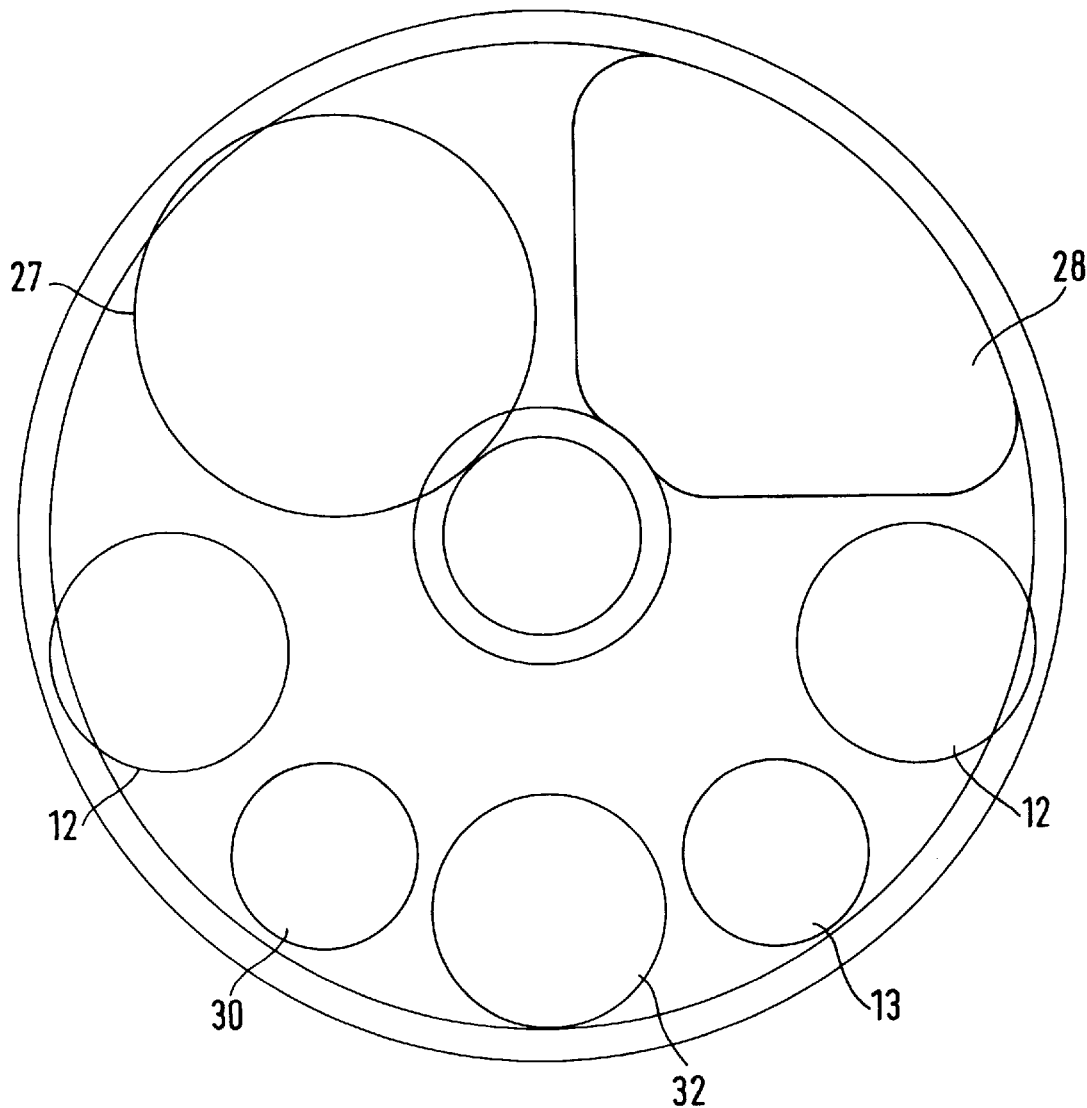
FIG. 5 is a top view of the control module of FIG. 4.

Another special advantage is the combined integration of the control module 8' (illustrated by a broken line), according to FIG. 4 and 5, in the first and/or second partial area of the caliper 23a, b and in the brake cylinder 1'. This integration surprisingly becomes possible because of the control module 8' according to FIG. 4 has a round base plate 26 as supporting body (with a protruding edge 26'), on which the individual components of the control module 8' are housed in a sector-type and functionally ordered manner. Preferably, plate is plastic.

In the embodiment of FIG. 4, for example, a solenoid (such as an ABS diaphragm valve) 27, an outlet sound absorber 28, two proportional valves 29a,b, a pressure control valve 30, a differential pressure sensor 31 as well as a wear sensor or an electric transmission adjusting motor 32 which carries out this function and also permits the adjustment, are arranged on the base plate 26. The adjusting motor 32 acts upon the synchronizing drive between the two adjusting spindles of the two spindle brake (not shown) and drives, for example, by means of a gear, a synchronizing chain, a toothed belt or a synchronized transmission.

The special advantage of the sector-type arrangement of the individual components according to FIGS. 4 and 5 and that a central area of the base plate 26 is provided with a hole 26", through which the piston rod 7' of the cylinder 1' can be guided, is that surprisingly it becomes possible to insert the base plate 26 together with the components arranged thereon such into the first partial area 23a (or the brake cylinder housing) of the caliper 23. Also some of the individual elements—particularly the relatively elongated proportional solenoids 29a, b—project from the first partial area 23a into the second partial area 23b and thus fill a space which remains unutilized according to the prior art of this type. In this case, the control module 8' is accommodated completely in the interior of the brake mechanism and is mechanically protected without increasing the dimensions of the brake. In addition, as the result of the combination of the caliper 23 and the brake cylinder 1' in connection with the electric adjusting motor, the otherwise necessary, purely mechanical adjusting unit can be eliminated and the space requirement can be further reduced. In a conventional manner, the central section of the second partial area 23b (see German Patent Document DE 40 32 885) is available as space for the movement of the piston rod 7 of the cylinder as well as for the movement of a rotary lever 33 for operating an eccentric application device 34. However, in the embodiment of FIG. 4, the rotary lever 33 does not act by way of the eccentric shaft 35 arranged eccentrically with respect to the axis of rotation of the lever end 33' but directly onto an application traverse element 36 of the two-spindle brake. The eccentric shaft 35 is used for the support against the caliper 23. A bow 37 holds the actuating device 21 together and thus permits the inserting of the actuating device 21 into the caliper area 23b as a preassembled unit.

Summarizing, the embodiments of FIGS. 1 and 2 provide a possibility for an uncomplicated retrofitting of existing disk brake systems with an EBS function. In addition, according to FIG. 3, a disk brake is obtained which can be standardized, is reasonable in cost, is extremely compact and into which the control module as well as the actuating device can be integrated as preassembled units in a rapid and uncomplicated manner. Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A compressed-air disk brake for vehicles comprising:
   a) an actuating device for applying brake blocks in the direction of a brake disk
   b) a brake cylinder which, when acted upon by compressed air, initiates a braking by way of the actuating device, and
   c) at least one control module including electronic and pneumatic-mechanical individual components and being integrated in the disk brake.

2. A disk brake according to claim 1, wherein the brake cylinder and the actuating device form a constructional unit.

3. A disk brake according to claim 1 including a caliper integral with the brake cylinder.

4. A disk brake according to claim 1 including a caliper having essentially three partial areas, specifically
   a first partial area which forms the outer housing of the brake cylinder,
   a second partial area which is molded to the first partial area and in which the actuating device is arranged, and
   a third partial area which is molded to the second partial area and which comprises the brake disk and the two brake blocks and which is used for transmitting the application forces from an actuating side to a reaction side of the brake disk.

5. A disk brake according to claim 4, wherein the control module is integrated in the first and/or second partial area of the caliper.

6. A disk brake according to claim 1, wherein the control module (8') has a a supporting body on which the individual components are arranged and the supporting body is within the interior of a housing of the disk brake.

7. A disk brake according to claim 6 wherein the supporting body is round or elliptical, and the individual components, with respect to their functions, are arranged in a sector-type manner on the supporting body.

8. A disk brake according to claim 7 wherein the components include one or more of a solenoid, an outlet sound absorber, two switching valves, a pressure control valve, a pressure sensor and a wear sensor arranged on the supporting body.

9. A disk brake according to claim 6 wherein the supporting body is in a first partial area of the housing with the brake cylinder and the individual components project at least partially from the first partial area into a second partial area of the housing with the actuating device.

10. A disk brake according to claim 9 wherein the individual elements are arranged on the supporting body and project into the second partial area such that a central section of the second partial area remains free as a space for the movement of a piston rod of the cylinder as well as for the movement of a rotary lever for the operation of an application element, of the actuating device.

11. A disk brake according to claim 9 wherein a compressed-air connection and an electric connection are constructed at a head end of the first partial area.

12. A disk brake according to claim 1 wherein the control module also includes an electric adjusting motor coupled to the brake block.

13. A disk brake according to claim 1 including a separate spring-loaded cylinder adjoining the brake cylinder.

14. A disk brake according to claim 1 including a ventilation system having a secondary chamber ventilation system which receives afterflowing air from a compressed-air feed pipe and emits outflowing air into the environment.

15. A disk brake according to claim 1 wherein the brake cylinder is a piston cylinder.

16. A disk brake as in claim 1, wherein the brake cylinder further comprises at least two housing sections, one of the housing sections enclosing a ventilation chamber, and at least one control module is arranged directly on or in one of the housing sections of the brake cylinder.

17. A disk brake according to claim 16, wherein at least one control module is molded directly to the housing section or is integrated in the housing section which encloses the ventilation chamber.

18. A disk brake according to claim 17, wherein the cylinder is one of a diaphragm-type cylinder or as a piston cylinder with a cover section and a bottom part, and the control module is arranged on the cover section.

19. A brake disk according to claim 17 wherein the cylinder is a combination cylinder with a cover section, an intermediate section and a housing section, and at least one control module is arranged on the intermediate section.

20. A disk brake according to claim 16 wherein at least one control module includes electronic and pneumatic-mechanical control sections.

21. A disk brake according to claim 16 wherein at least one control module is designed such that it can control the pressure into the brake cylinder and can lower the pressure.

22. A disk brake according to claim 16 wherein at least one control module includes a relay valve and several solenoids.

23. A disk brake according to claim 16 wherein at least one control module has at least one electric connection and at least one compressed-air connection.

24. A compressed-air disk brake according to claim 16 wherein at least one control module includes a pressure sensor.

25. A disk brake according to claim 16 including at least one lining wear sensor connected respectively to at least one control module.

26. A disk brake according to claim 16 wherein at least one control module has a central structure section which is constructed in one piece with one of the housing sections and which comprises recesses, and pneumatic and electric elements of the control module fitting into these recesses.

27. A disk brake according to claim 26, wherein the central structure section is closed off toward the outside by the connector plate and by a closure body.

28. A disk brake according to claim 16, wherein at least one control module is in the ventilation chamber.

* * * * *